US005767176A

United States Patent [19]

Nakanishi et al.

[11] Patent Number: 5,767,176
[45] Date of Patent: Jun. 16, 1998

[54] AQUEOUS DISPERSION COMPOSITION CONTAINING MICROCRYSTALLINE CELLULOSE AND COMPOSITION USING THE SAME

[75] Inventors: Masuhiko Nakanishi, Ihara-gun; Masahiko Otuka, Yokosuka; Isao Takagi, Fuji, all of Japan

[73] Assignee: Asahi Kasei Kogyo Kabushiki Kaisha, Osaka, Japan

[21] Appl. No.: 693,316

[22] PCT Filed: Nov. 18, 1994

[86] PCT No.: PCT/JP94/01949

§ 371 Date: Aug. 15, 1996

§ 102(e) Date: Aug. 15, 1996

[87] PCT Pub. No.: WO95/22571

PCT Pub. Date: Aug. 24, 1995

[30] Foreign Application Priority Data

Feb. 16, 1994 [JP] Japan .................................. 6-019256

[51] Int. Cl.[6] .......................... C08L 63/00; C08L 63/02
[52] U.S. Cl. .......................... 523/404; 523/414; 523/420; 162/164.3
[58] Field of Search .................... 162/164.3; 523/404, 523/414, 420

[56] References Cited

U.S. PATENT DOCUMENTS 3,870,666 3/1975 Becker ........................... 260/21
5,430,078 7/1995 Hoppe-Hoeffler et al. ........ 523/414

FOREIGN PATENT DOCUMENTS

A-63-223025 9/1988 Japan .

*Primary Examiner*—Frederick Krass
*Attorney, Agent, or Firm*—Pennie&Edmonds LLP

[57] ABSTRACT

An aqueous dispersion composition having excellent properties as a basic composition of a paper coating for improving printability, a paper strengthening agent, a cement compounding additive, a paint, an adhesive, etc., and a coating composition, a pulp composition and a mortar composition each containing the aqueous dispersion composition. The aqueous dispersion composition comprises an epoxy resin aqueous dispersion consisting of 100 parts by weight of an epoxy resin, 0.1 to 5.0 parts by weight of microcrystalline cellulose, and 0.1 to 10 parts by weight of a surface active agent; and a water-insoluble polyamine type curing agent. Use of the aqueous dispersion composition provides a coating composition, a pulp composition and a mortar composition each having excellent handling properties with respect to adhesion and viscosity, and excellent stability after curing even under a high temperature and high humid condition or a low temperature and low humid condition.

11 Claims, No Drawings

AQUEOUS DISPERSION COMPOSITION CONTAINING MICROCRYSTALLINE CELLULOSE AND COMPOSITION USING THE SAME

TECHNICAL FIELD OF THE INVENTION

The present invention relates to an aqueous dispersion composition which provides excellent properties as a basic composition of a paper coating for improving printability, a paper strengthening agent, a cement compounding additive, a paint, an adhesive, etc. More particularly, it relates to an aqueous dispersion composition of an epoxy resin which, when cured, manifests the full characteristics possessed by an epoxy resin without causing reduction in water resistance and adhesion of a cured product, and also to a coating composition, a pulp composition and a mortar composition each using the aqueous dispersion composition.

BACKGROUND OF THE INVENTION

In recent years, an aqueous polymer dispersion of a thermoplastic resin obtained by emulsion polymerization of an acrylic system, an acrylate-styrene system, a vinyl acetate system, an ethylene-vinyl acetate system, etc. has been widely used in industry as a paint, an adhesive or a compounding additive for cement. Further, a polyamide urea-formaldehyde aqueous solution, a urea-formaldehyde resin aqueous solution, and melamine-formaldehyde resin aqueous solution have been used as a paper coating for improving printability, a paper strengthening agent, etc.

A film formed of these conventional aqueous polymer dispersions has insufficient adhesion to metal, wood, hardened cement, plastics, etc. and also insufficient resistance to water and heat resistance and therefore often suffers from separation or blistering in a wet state or in a high temperature. In order to improve such defects of an aqueous dispersion of a thermoplastic resin, it has been proposed to introduce a functional group into the skeleton of a polymer to form a crosslinked structure, but the effects are still insufficient. JP-A-61-87722 (the term "JP-A" as used herein means an "unexamined published Japanese patent application") describes a method for producing spherical particles of an epoxy resin by curing an emulsion of epoxy compound emulsified in the presence of a powdery emulsifier using an amine type curing agent. Since the curing agent for the production of epoxy resin spherical particles is water-soluble so that the resulting emulsion has a high viscosity and the epoxy resin spherical particles already have its structure crosslinked by the curing agent, they exhibit no adhesiveness at all. The mortar composition disclosed in JP-B-59-34670 (the term "JP-B" as used herein means an "examined published Japanese patent application") is hardly adhesive at room temperature because the epoxy resin dispersion used has a relatively high softening point. Further, an aqueous solution of a formaldehyde skeleton, though satisfactory in water resistance, has reduced adhesion in a dry state. Besides, it is essentially accompanied by generation of formalin, giving rise to an environmental problem.

An object of the present invention is to provide an aqueous dispersion composition which is free from the above-mentioned problems and which exhibits excellent handling properties with respect to adhesion and viscosity, and excellent stability after curing even under a high temperature and high humid condition or a low temperature and low humid condition.

Another object of the present invention is to provide a composition compounding the aqueous dispersion composition, which possesses excellent properties practical for a coating composition, and a pulp composition, or a mortar composition.

DISCLOSURE OF THE INVENTION

As a result of extensive study, it has been found that the above-mentioned problems associated with conventional aqueous polymer dispersions can be settled by combining an aqueous dispersion of an epoxy resin which is a thermosetting resin and a water-insoluble polyamine type curing agent.

The present invention relates to an aqueous dispersion composition comprising an epoxy resin aqueous dispersion consisting of 100 parts by weight of an epoxy resin, 0.1 to 5.0 parts by weight of a microcrystalline cellulose, and 0.1 to 10 parts by weight of a surface active agent; and a water-insoluble polyamine type curing agent. The present invention provides a coating composition for mainly comprising a pigment for paper and a binder for the pigment, which contains 0.1 to 5 parts by weight of the above-mentioned aqueous dispersion composition and 6 to 20 parts by weight of the binder for the pigment, each per 100 parts by weight of the pigment for paper. The present invention further provides a pulp composition mainly comprising pulp, which contains 0.1 to 5.0 parts by weight, per 100 parts by weight of the pulp, of the above-mentioned aqueous dispersion composition. The present invention furthermore provides a mortar composition mainly comprising cement and aggregate, which contains 3 to 35 parts by weight of the above-mentioned aqueous dispersion composition and 50 to 500 parts by weight of an aggregate per 100 parts by weight of the cement.

The present invention will further be illustrated below in greater detail.

The epoxy resin which can be used in the present invention is a polymer obtained by polymerizing a monomer having examples of the monomer two or more epoxy groups per molecule, and examples of the monomer include glycidyl ethers, glycidyl esters, glycidylamines, linear aliphatic epoxides, and alicyclic epoxides.

The glycidyl ethers include a diglycidyl ether of a bisphenol, a polyglycidyl ether of a phenolic novolak, and a diglycidyl ether of an alkylene glycol or a polyalkylene glycol. Examples of the bisphenol diglycidyl ethers are diglycidyl ethers of dihydric phenols, such as bisphenol A, bisphenol F, bisphenol AD, bisphenol S, tetramethylbisphenol A and tetrabromobisphenol A. Examples of the phenolic novolak polyglycidyl ethers are polyglycidyl ethers of novolak resins, such as phenolic novolak, cresol novolak, and brominated phenolic novolak. Examples of the diglycidyl ethers of alkylene glycols or polyalkylene glycols are diglycidyl ethers of glycols, such as polyethylene glycol, polypropylene glycol, and butanediol.

The glycidyl esters include a diglycidyl ester of hexahydrophthalic acid and a diglycidyl ester of a dimer acid.

The glycidylamines include tetraglycidyldiaminodiphenylmethane, tetraglycidyl-m-xylenediamine, triglycidylaminophenol, and triglycidyl isocyanurate.

The linear aliphatic epoxides include epoxidized polybutadiene, and epoxidized soybean oil. The alicyclic epoxides include 3,4-epoxy-6-methylcyclohexylmethyl carboxylate and 3,4-epoxycyclohexylmethyl carboxylate.

While not limiting, preferred epoxy resins are polymers of glycidyl ethers, glycidylamines, or glycidyl esters, with those of glycidyl ethers being still preferred. Of the glycidyl ethers, preferred are diglycidyl ethers of bisphenols. A diglycidyl ether of bisphenol A or bisphenol F is particularly preferred as the monomer. These epoxy resins may be used either individually or in combination of two or more thereof.

The epoxy resin to be used has an epoxy equivalent of from 100 to 1500, preferably from 150 to 750.

The terminology "microcrystalline cellulose" as used herein is as defined in O. A. Battista, *Industrial & Engineering Chemistry*, Vol. 42, pp. 502–507 (1950). It means an aggregate of cellulose crystallites having substantially a constant degree of polymerization which is obtained by acid hydrolysis or alkali oxidative decomposition of cellulose.

The microcrystalline cellulose of the present invention preferably contains at least 5% by weight of crystalline cellulose having a Stokes' diameter of not more than 1 µm, whereby the effect of the present invention can be enhanced. When the microcrystalline cellulose is milled in the presence of water, the resulting milled microcrystalline cellulose preferably has an average particle size of 5 µm or less in terms of Stokes' diameter.

The microcrystalline cellulose which is preferably used in the present invention includes the one obtained by milling crystalline cellulose and a dispersant, such as a water-soluble gum, and, if desired a disintegrator, such as a starch decomposition product, in the presence of water, followed by drying. Examples of the methods for preparing such microcrystalline cellulose are described in JP-B-40-12174, JP-B-57-14771 (corresponding to U.S. Pat. No. 4,383,111 issued May 10, 1983), and Japanese Patent Application No. 259396/92. The microcrystalline cellulose is preferably used in an amount of from 0.1 to 5.0 parts by weight per 100 parts by weight of the epoxy resin. If the proportion of the microcrystalline cellulose is less than 0.1 part by weight, the epoxy resin is not sufficiently dispersed in water and tends to precipitate and separate. If it exceeds 5.0 parts by weight, the hardened film of the polymer dispersion would be reduced too much to withstand practical use. A still preferred proportion of the microcrystalline cellulose is 0.3 to 3.0 parts by weight per 100 parts by weight of the epoxy resin.

The surface active agent which can be used in the present invention includes anionic surface active agents, cationic surface active agents, amphoteric surface active agents, and nonionic surface active agents. The anionic surface active agents include fatty acid salts, sulfuric ester salts of higher alcohols, sulfuric ester salts of liquid fatty oils, aliphatic amine or amide sulfates, phosphoric esters of aliphatic alcohols, sulfonates of dibasic fatty acid esters, aliphatic amide sulfonates, alkylallylsulfonates, and formalin-condensed naphthalenesulfonates. The cationic surface active agents include primary amine salts, secondary amine salts, tertiary amine salts, quaternary ammonium salts, and pyridinium salts. The amphoteric surface active agents include a carboxylic acid type (betaine), a sulfuric ester type, and a sulfonic acid type. The nonionic surface active agents include polyoxyethylene alkyl ethers, polyoxyethylene alkylphenyl ethers, polyoxyethylene alkyl esters, sorbitan alkyl esters, polyoxyethylene sorbitan alkyl esters, and ethylene oxidepropylene oxide block copolymers.

The surface active agent is preferably used in an amount of 0.1 to 10 parts by weight per 100 parts by weight of the epoxy resin. If the amount of the surface active agent is less than 0.1 part by weight, the epoxy resin settles out due to poor water dispersibility. If it exceeds 10 parts by weight, the hardened film has insufficient water resistance and adhesion for practical use. A preferred proportion of the surface active agent is from 0.5 to 8 parts by weight per 100 parts by weight of the epoxy resin.

In addition to the above-described surface active agent, the epoxy resin aqueous dispersion may further contain a dispersant, a water-soluble polymer, a protective colloid, and the like. For example, it may contain a polyphosphate, a polyacrylate, a maleic anhydride copolymer, polyvinyl alcohol, hydroxyethyl cellulose, methyl cellulose, gelatin, albumin, or gum arabic.

The epoxy resin aqueous dispersion which is a component of the aqueous dispersion composition of the present invention preferably has an average dispersed particle size of less than 10 µm. If the average particle size exceeds 10 µm, the dispersed epoxy resin particles tend to settle and agglomerate, and the hardened product would have markedly reduced adhesion and water resistance.

The epoxy resin aqueous dispersion as a component of the aqueous dispersion composition of the present invention can be obtained by dispersing the above-mentioned epoxy resin, microcrystalline cellulose, surface active agent, and water by means of a dispersing machine imposing shearing force. Examples of the dispersing machine imposing shearing force include a homomixer, a rotary homogenizer, a piston homogenizer, and a planetary mixer.

The order of addition of the materials to a dispersing machine is not particularly limited. All the materials may be mixed together and emulsified, or the materials may be added in a specifically selected order in accordance with the purpose. Note that the microcrystalline cellulose is preferably added as a 2 to 5% by weight aqueous dispersion previously prepared by the use of a dispersing machine.

The water-insoluble polyamine type curing agent which can be used in the present invention includes a self-emulsifiable polyamine type curing agent.

Such a curing agent includes modified aliphatic or alicyclic polyamine type curing agents modified with an epoxy resin. Also included are polyaminoamide type curing agents which are reaction products between an aliphatic polyamine and a polymerized fatty acid.

The above-described polyaminoamide type curing agent is a compound having a plurality of active amino groups and at least one amido group, such as aliphatic polyamine. condensates produced by a condensation reaction of polyalkylene polyamines and polymerized fatty acids (so-called "dimer acids") derived from natural unsaturated fatty acids with or without other fatty acids. A typical example of the polyalkylene polyamine is a polyethylene polyamine such as ethylenediamine, diethylenetriamine, triethylenetetramine, tetraethylenepentamine, pentaethylenehexamine, and the like. The polymerized fatty acid is industrially produced by heating a fatty acids having many unsaturated bonds (e.g., linoleic acid and linolenic acid) derived from natural oils (e.g., tall oil, soybean oil, and safflower oil) in the presence or absence of a catalyst such as clay, alumina silicate and the like.

Products of the curing agent available commercially available include Ancamide 500 and 502 (trade names of polyaminoamide type curing agents comprising alphatic polyalkylene polyamine condensates, sold by ACI Japan), Ancamine 1618 (trade name of modified alicyclic polyamine type curing agent, sold by ACI Japan), and Casamid 2221 (trade name of modified aliphatic polyamine type curing agent, sold by ACI Japan).

The water-insoluble polyamine type curing agent to be used in the present invention is applicable to various uses in combination with a water-soluble curing agent, such as diethylenetetramine or N-aminoethylenepiperazine.

There is no particular limitation on the ratio (solid basis) of the epoxy resin aqueous dispersion to the water-insoluble polyamine type curing agent to be used and it may vary depending on the intended use.

The water dispersion composition of the present invention can be emulsified due to water-insulble fine particles upon mixing in water. Further the water dispersion composition of the present invention contains the epoxy resin aqueous dispersion and the water-insoluble polyamine type curing agent in their unreacted state, and after compounding the water dispersion composition with another composition for an intended purpose and applying the resulting composition to the intended purpose, the epoxy resin aqueous dispersion is cured by the reaction with the water-insoluble polyamine type curing agent upon heating the composition or drying at room temperature.

The coating composition according to one embodiment of the present invention mainly comprises a pigment for paper and a binder for the pigment and contains 0.1 to 5.0 parts by weight of the aforesaid aqueous dispersion composition containing the epoxy resin aqueous dispersion and the water-insoluble polyamine type curing agent and 6 to 20 parts by weight of the binder for the pigment per 100 parts by weight of the pigment for paper.

If the proportion of the aqueous dispersion composition in the coating composition is less than 0.1 part by weight, the effects of the present invention cannot be produced. If it exceeds 5.0 parts by weight, the viscosity of the coating composition increases to deteriorate workability.

The water dispersion composition used in the coating composition preferably has a weight ratio of the epoxy resin to the water-insoluble polyamine type curing agent of from 0.1 to 2.0. If the weight ratio of the epoxy resin and the water-insoluble polyamine type curing agent is less than 0.1, sufficient wet pick strength and wet ink adhesion, which are important characteristics of printing paper, may not be obtained. If it exceeds 2.0, not only the viscosity of the coating composition may be increased too much, but dry pick strength in printing may also be reduced.

The binder which can be used in the present invention includes generally employed binders for pigments, such as synthetic binders, e.g., SB latices, acrylic latices, and vinyl acetate latices; and natural binders, such as starch and casein. The pigment binder is used in an amount of 6 to 20 parts by weight per 100 parts by weight of the pigment for paper. If the proportion of the pigment binder is less than 6 parts by weight, dry pick strength and wet pick strength are seriously reduced. If it exceeds 20 parts by weight, ink adhesion and ink setting properties are markedly reduced.

The pigments which can be used in the coating composition include mineral pigments generally used in coating composition for paper, such as clay, calcium carbonate, titanium oxide, and satin white; and organic pigments called plastic pigments, such as polystyrene fine particles.

The coating composition of the present invention may further contain various additives generally employed, such as a dispersant, a thickener, a neutralizing agent, a bactericidal agent, a deforming agent, and so on.

Preparation of the coating composition is not limited to a specific method, and it may be prepared by mixing the pigment, the binder and various additives with the water dispersion composition as previously prepared, or with the epoxy resin aqueous dispersion and the water-insoluble polyamine type curing agent separately, i.e., without prepreparation of the water dispersion composition.

The pulp composition according to another embodiment of the present invention mainly comprises pulp, which contains 0.1 to 5.0 parts by weight of the aqueous dispersion composition per 100 parts by weight of the pulp.

If the proportion of the aqueous dispersion composition is less than 0.1 part by weight, the effects of the present invention cannot be exerted. If it exceeds 5.0 parts by weight, a pulp slurry compounding the pulp composition therein has an increased viscosity, and the resulting paper has deteriorated formation and suffers from drastic reduction in folding endurance.

The water dispersion composition used in the pulp composition preferably has a weight ratio of the epoxy resin to the water-insoluble polyamine type curing agent of from 0.1 to 2.0. If the weight ratio of the epoxy resin and the water-insoluble polyamine type curing agent is less than 0.1 or more than 2.0, folding endurance is steeply reduced.

The pulp composition containing the aqueous dispersion composition of the present invention may be added directly to a pulp slurry but is preferably used as diluted to an appropriate concentration. It may be used in combination with other additives, such as a rosin sizing agent or aluminum sulfate.

Preparation of the pulp composition is not limited to a specific method, and it may be prepared by mixing the pulp slurry having a properly adjusted concentration of pulp with the water dispersion composition as previously prepared, or with the epoxy resin aqueous dispersion and the water-insoluble polyamine type curing agent, separately, instead of mixing with the previously prepared water dispersion composition.

The mortar composition mainly comprising cement and aggregate, according to still another embodiment of the present invention, contains 3 to 35 parts by weight, preferably 5 to 30 parts by weight, of the aqueous dispersion composition per 100 parts by weight of the cement. If the proportion of the aqueous dispersion composition is less than 3 parts by weight, tensile bond strength and water-resistant strength are not sufficiently improved. If it exceeds 35 parts by weight, the rigidity essential to cement mortar is lost.

The weight ratio of the epoxy resin to the water-insoluble polyamine type curing agent in the mortar composition is not particularly limited but is preferably 0.5 to 2.5. If it is less than 0.5 or more than 2.5, tensile bond strength and water-resistant strength tend to be drastically reduced.

The effects of the mortar composition of the present invention may be enhanced by use of a water-retaining agent. A water-retaining agent is usually used in a mortar composition. Examples of suitable water-retaining agents include methyl cellulose, hydroxyethyl cellulose, and sodium acrylate. It is used in an amount of 0.05 to 2.0 parts by weight, preferably 0.1 to 1.5 parts by weight, per 100 parts by weight of cement. Addition of less than 0.05 part by weight of a water-retaining agent brings about no enhancement of the effects of the present invention. Addition of more than 2.0 parts by weight of a water-retaining agent not only increases the viscosity of the mortar composition to deteriorate the workability but reduces the water-resistant strength.

Where the mortar composition of the present invention is applied in low temperatures of about 10° C. or lower, it is recommended to add 10 to 120 parts by weight of a styrene-butadiene copolymer latex and/or an acrylic copolymer latex per 100 parts by weight of the epoxy resin aqueous dispersion thereby to markedly improve tensile bond strength in low temperatures. If added in an amount less than 10 parts, these copolymer latices show no effect of improving tensile bond strength in low temperatures. Addition of the copolymer latices in an amount exceeding 120 parts by weight results in reduction of compressive strength. The styrene-butadiene copolymer latex and/or acrylic copolymer latex to be used preferably have a glass transition temperature between −25° C. and +5° C. If the glass transition temperature is lower than −25° C., compressive strength is reduced. If it exceeds +5° C., the mortar composition tends to have insufficient film-forming properties, and the water resistance of the mortar tends to be reduced.

The cement which can be used in the present invention is hydraulic calcium silicate cement including single cement, such as common portland cement, rapid-hardening portland cement, ultra-rapid-hardening portland cement, moderate heat portland cement, white cement, etc.; and mixed cement, such as blast furnace cement, silica cement, fly ash cement, etc. These kinds of cement may be used either individually or in combination of two or more thereof.

The aggregate which can be used in the present invention include siliceous sand, river sand, grinds of stone, grinds of porcelain, grinds of glass, and glass beads. These kinds of aggregate may be used either individually or in combination of two or more thereof. The aggregate is mixed with cement in a proportion of 50 to 500 parts by weight, preferably 70 to 300 parts by weight, per 100 parts by weight of cement.

If desired, the mortar composition may further contain various additives generally used, such as deforming agents, foarming agents, accelerators of hardening, retarders, rust inhibitors, water repellents, expanding agents, and dispersants.

Preparation of the mortar composition is not limited to a specific method, and it may be prepared by mixing the cement, the aggregate and various additives with the water dispersion composition as previously prepared, or with the epoxy resin aqueous dispersion and the water-insoluble polyamine type curing agent, separately, instead of mixing with the previously prepared water dispersion composition.

BEST MODE FOR PRACTICING THE INVENTION

The present invention will now be illustrated in greater detail with reference to Examples and Comparative Examples, but it should be understood that the present invention is not construed as being limited thereto.

Various physical properties were measured according to the following methods.

Measurement of Epoxy Resin Aqueous Dispersion
(1) Average Particle Size:

Measured with a laser type particle size distribution meter LA-700, manufactured by Horiba.

Measurement of Coating Composition
(1) Viscosity:

Measured at 25° C. with a BL type viscometer (60 rpm, No. 3 spindle).

(2) Dry Pick Strength:

Coated paper was printed three times on an RI printing tester using 0.4 cc of a printing ink (SD Super Deluxe 50 Beni B; tack value: 15; manufactured by Toka Shikiso K.K.) for each printing. The picking on the rubber roll was transferred to another mount, and the degree of picking was observed. Evaluation was conducted by a 5-point relative evaluation method, and coated paper having suffered less picking was rated higher.

(3) Wet Pick Strength:

Coated paper, with its surface damped with a dampening form roller, was printed once on an RI printing tester using 0.4 cc of a printing ink (SD Super Deluxe 50 Beni B; tack value: 10; manufactured by Toka Shikiso K.K.). The picking on the rubber roll was transferred to another mount, and the degree of picking was observed. Evaluation was conducted by a 5-point relative evaluation method, and coated paper having suffered less picking was rated higher.

(4) Inc Adhesion:

After applying water to coated paper by a molleton roll, printing was carried out using an RI printing tester under conditions that caused no picking. The ink transfer (the printed ink density) was observed with the naked eye. Evaluation was conducted by a 5-point relative evaluation method, and coated paper exhibiting higher ink transfer was rated higher.

(5) Paper Gloss:

The surface gloss of coated paper was measured with a Murakami type glossmeter GM-26D at 75°–75°. The higher the value, the higher the gloss.

(6) Print Gloss:

Coated paper was printed solid on an RI printing tester using 0.4 cc of a printing ink (SD Super Deluxe 50 Ai, produced by Toka Shikiso K.K.). After drying, the printed surface gloss was measured with a Murakami type glossmeter GM-26D at 60°–60°. The higher the value, the higher the gloss.

Measurement of Pulp Composition
(1) Folding Endurance:

Measured with an MIT type folding endurance testing machine in accordance with JIS P8115.

(2) Relative Burst Strength:

Measured with a Mullen-type hydraulic burst strength machine in accordance with JIS P8112. The burst strength was expressed relatively taking that of paper containing no aqueous dispersion composition of the present invention as a standard (100).

(3) Relative Ring Crushing Strength:

Measured with a ring crush tester in accordance with JIS P8116. The results was relatively expressed in the same manner as in (2) above.

(4) Surface Strength:

Evaluated in terms of picking on wax. The greater the value, the higher the surface strength.

Measurement of Mortar Composition
(1) Workability:

A mortar composition prepared by a prescribed method was applied to a concrete plate, and applicability with a trowel and a spatula was visually evaluated.

(2) Tensile Bond Strength:

A 2 mm high formwork was set up on a concrete plate specified in JIS A5304, and a mortar composition prepared by a prescribed method was cast therein and leveled with a trowel. After curing the test piece in a thermo-hygrostat at 20° C. and 65% RH for 7 days or 5° C. and 65% RH for 7 days, the tensile bond strength in the vertical direction was measured with a tensile tester invented by Building Research Institute, Ministry of Construction, Japan.

(3) Water-Resistant Strength:

The test piece prepared in (2) above (already fitted with an attachment for a tensile tester invented by Building Research Institute) was immersed in water for 1 day. The test piece was taken out of water, water around the attachment was wiped off, and the test piece was pulled in the vertical direction to measure bond strength with the tensile tester.

(4) Compressive Strength:

Measured in accordance with the test method for compressive strength described in JIS K6911.

EXAMPLE 1

A coating composition was prepared using 0.3 part by weight of an epoxy resin aqueous dispersion shown below and 0.2 part by weight of a polyaminoamide type curing agent comprising an aliphatic polyalkylene polyamine condensate "Ancamide 502" (sold by ACI JAPAN) as a water-insoluble polyamine type curing agent, according to the formulation shown below by the method described below.

| Preparation of Epoxy Resin Aqueous Dispersion: | |
|---|---|
| | Part by Wt. |
| Bisphenol A type epoxy resin "AER331C", produced by Asahi Kasei Kogyo K.K. (epoxy equivalent: 190) | 100 |
| Microcrystalline cellulose "AVICEL RC 591", produced by Asahi Kasei Kogyo K.K. | 0.5 |
| Nonionic surface active agent (polyoxyethylene nonylphenyl ether) "Newcol 506", produced by Nippon Nyukazai K.K. | 0.5 |
| Purified water | 100 |

The nonionic surface active agent was previously formulated into a 25% by wight aqueous solution. The microcrystalline cellulose was previously formulated into a 5% by weight aqueous dispersion. All the components were uniformly dispersed in a homomixer at 6000 rpm for 15 minutes to obtain an epoxy resin aqueous dispersion having an average particle size of 3 μm.

| Formulation of Coating Composition: | |
|---|---|
| | Part by Wt. |
| Clay "Ultracoat", produced by EMC | 70 |
| Calcium carbonate "Super 1700", produced by Maruo Calcium Co., Ltd. | 30 |
| Dispersant (sodium polyacrylate) "Aron T-40", produced by Toagosei Chemical Industry Co., Ltd. | 0.2 |
| Neutralizing agent (sodium hydroxide) | 0.1 |
| Starch "Oji Ace A", produced by Oji Corn Starch K.K. | 3 |
| Carboxylated SB-based "latex L1608", produced by Asahi Kasei Kogyo K.K. | 11 |
| Epoxy resin aqueous dispersion described above | 0.3 |
| Water-insoluble polyamine type curing agent "Ancamide 502", sold by ACI Japan | 0.2 |

In a prescribed amount of water were dispersed 70 parts by weight of clay, 30 parts by weight of calcium carbonate, 0.2 part by weight of the dispersant (sodium polyacrylate), and 0.1 part by weight of the neutralizing agent (sodium hydroxide) to prepare a pigment slurry. To the slurry were added 3 parts by weight of starch (Oji Ace A) having previously been solubilized and formulated into a solution, 11 parts by weight of the carboxylated SB-based latex (L1608), 0.3 part by weight of the epoxy resin aqueous dispersion, and the water-insoluble polyamine type curing agent (Ancamide 502), followed by mixing by stirring. An adequate amount of water was added thereto to obtain a coating composition for paper having a final solid content of 65% by weight.

The resulting coating composition was applied to a base paper at a spread of 14 g/m$^2$ by means of a wire bar and dried in a hot air drier (150° C.×30 sec). The coated paper was passed through a supercalender (roll temperature: 50° C.; roll pressure: 150 kg/cm) twice and then conditioned in a thermo-hygrostat at 23° C. and 65% RH to prepare test pieces. Various physical properties were measured. The results obtained are shown in Table 1.

EXAMPLE 2

A coating composition and test pieces of coated paper were prepared in the same manner as in Example 1, except for using 0.1 part by weight of the epoxy resin aqueous dispersion prepared in Example 1 and 0.3 part by weight of a polyaminoamide type curing agent comprising an aliphatic polyalkylene polyamine condensate "Ancamide 500" (sold by ACI JAPAN) as a water-insoluble polyamine type curing agent. The results of measurement of various physical properties are shown in Table 1.

EXAMPLE 3

A coating composition and test pieces of coated paper were prepared in the same manner as in Example 1, except for using 0.1 part by weight of the epoxy resin aqueous dispersion prepared in Example 1 and 0.4 part by weight of a polyaminoamide type curing agent comprising an aliphatic polyalkylene polyamine condensate "Ancamide 503" (sold by ACI JAPAN) as a water-insoluble polyamine type curing agent. The results of measurement of various physical properties are shown in Table 1.

EXAMPLE 4

A coating composition and test pieces of coated paper were prepared in the same manner as in Example 1, except for using 2 parts by weight of the epoxy resin aqueous dispersion prepared in Example 1 and 2 parts by weight of a modified alicyclic polyamine type curing agent "Ancamine 1618" (sold by ACI JAPAN) as a water-insoluble polyamine type curing agent. The results of measurement of various physical properties are shown in Table 1.

COMPARATIVE EXAMPLE 1

A coating composition and test pieces of coated paper were prepared in the same manner as in Example 1, except for excluding the epoxy resin aqueous dispersion and the water-insoluble polyamine type curing agent from the formulation of the coating composition. The results of measurement of various physical properties are shown in Table 1.

COMPARATIVE EXAMPLES 2 TO 5

A coating composition and test pieces of coated paper were prepared in the same manner as in Example 1, except for using the epoxy resin aqueous dispersion and the water-insoluble polyamine type curing agent as shown in Table 1. The results of measurement of various physical properties are shown in Table 1.

COMPARATIVE EXAMPLE 6

A coating composition and test pieces of coated paper were prepared in the same manner as in Example 1, except for using 0.3 part by weight of the epoxy resin aqueous dispersion prepared in Example 1 and 0.2 part by weight of a curing agent comprising a tetraethylenetetramine compound "TETA" (sold by ACI JAPAN) as a water-soluble polyamine type curing agent. The results of measurement of various physical properties are shown in Table 1.

COMPARATIVE EXAMPLE 7

A coating composition and test pieces of coated paper were prepared in the same manner as in Example 1, except for using 0.1 part by weight of the epoxy resin aqueous dispersion prepared in Example 1 and 0.3 part by weight of a curing agent comprising an N-aminoethylenepiperazine compound "N-AEP" (sold by ACI JAPAN) as a water-soluble polyamine type curing agent. The results of measurement of various physical properties are shown in Table 1.

COMPARATIVE EXAMPLE 8

The same components of the epoxy resin aqueous dispersion as used in Example 1 were dispersed in a homomixer at a reduced number of rotation (1000 rpm) to obtain an epoxy resin aqueous dispersion having an average particle size of 14 μm. A coating composition for paper and test pieces of coated paper were prepared in the same manner as in Example 1, except for using 0.3 part by weight of the above-obtained epoxy resin aqueous dispersion and 0.2 parts by weight of the water-insoluble polyamine type curing agent "Ancamide 500" (sold by ACI JAPAN). The results of measurement of various physical properties are shown in Table 1.

a water-insoluble polyamine type curing agent "Ancamide 502" (sold by ACI JAPAN), followed by further stirring for 5 minutes. The resulting slurry was processed in a TAPPI square sheet machine, the paper was pressed and dried in a rotary drier to prepare test pieces. Various properties were measured using the test pieces. The results obtained are shown in Table 2.

EXAMPLES 6 TO 8

Test pieces were prepared in the same manner as in Example 5, except for using the aqueous dispersion composition as shown in Table 2. The results of measurement are shown in Table 2.

COMPARATIVE EXAMPLE 9

Test pieces were prepared in the same manner as in Example 5, except for using a pulp slurry having a pulp concentration of 1.0% by weight and containing no aqueous dispersion composition. The results of measurement are shown in Table 2.

COMPARATIVE EXAMPLES 10 TO 13

Test pieces were prepared in the same manner as in Example 5, except for using the aqueous dispersion com-

TABLE 1

| | Example No. | | | | Comparative Example No. | | | | | | | |
|---|---|---|---|---|---|---|---|---|---|---|---|---|
| | 1 | 2 | 3 | 4 | 1 | 2 | 3 | 4 | 5 | 6 | 7 | 8 |
| Coating Compound (part) | | | | | | | | | | | | |
| Clay (Ultracoat) | 70 | 70 | 70 | 70 | 70 | 70 | 70 | 70 | 70 | 70 | 70 | 70 |
| CaCO3 (Super 1700) | 30 | 30 | 30 | 30 | 30 | 30 | 30 | 30 | 30 | 30 | 30 | 30 |
| Dispersant (Aron T-40) | 0.2 | 0.2 | 0.2 | 0.2 | 0.2 | 0.2 | 0.2 | 0.2 | 0.2 | 0.2 | 0.2 | 0.2 |
| Neutralizing agent (sodium hydroxide) | 0.1 | 0.1 | 0.1 | 0.1 | 0.1 | 0.1 | 0.1 | 0.1 | 0.1 | 0.1 | 0.1 | 0.1 |
| Starch (Oji Ace A) | 3 | 3 | 3 | 3 | 3 | 3 | 3 | 3 | 3 | 3 | 3 | 3 |
| SB-based latex (L1608) | 11 | 11 | 11 | 11 | 11 | 11 | 11 | 11 | 11 | 11 | 11 | 11 |
| Epoxy resin aqueous dispersion | 0.3 | 0.1 | 0.1 | 2.0 | — | 0.05 | 3.0 | 0.04 | 0.21 | 0.3 | 0.1 | 0.3 |
| Water-insoluble polyamine type curing agent: | | | | | | | | | | | | |
| Ancamide 500 | — | 0.3 | — | — | — | — | — | — | — | — | — | 0.2 |
| Ancamide 502 | 0.2 | — | — | — | — | 0.03 | — | 0.26 | 0.09 | — | — | — |
| Ancamide 503 | — | — | 0.4 | — | — | — | 2.5 | — | — | — | — | — |
| Ancamine 1618 | — | — | — | 2.0 | — | — | — | — | — | — | — | — |
| Water-soluble polyamine curing agent: | | | | | | | | | | | | |
| TETA*[1] | — | — | — | — | — | — | — | — | — | 0.2 | — | — |
| N-AEP*[2] | — | — | — | — | — | — | — | — | — | — | 0.3 | — |
| Practical Properties: | | | | | | | | | | | | |
| Viscosity of compound (BL type; cps) | 1460 | 1510 | 1720 | 1760 | 1050 | 1120 | (3*) | 2340 | 1540 | (*3) | (*3) | 1480 |
| Paper gloss (%) | 68.4 | 68.5 | 68.2 | 68.7 | 68.1 | 68.2 | | 67.3 | 67.8 | | | 67.9 |
| Print gloss (%) | 56.8 | 56.7 | 57.1 | 57.2 | 53.2 | 53.2 | | 54.5 | 53.6 | | | 53.6 |
| RI Printability: | | | | | | | | | | | | |
| Dry pick strength | 3.0 | 3.0 | 3.0 | 3.0 | 2.8 | 2.9 | | 2.9 | 3.0 | | | 2.9 |
| Wet pick strength | 3.2 | 3.2 | 3.3 | 3.3 | 2.7 | 2.8 | | 2.9 | 2.8 | | | 3.1 |
| Ink adhesion | 3.3 | 3.3 | 3.2 | 3.3 | 2.6 | 2.8 | | 3.0 | 2.8 | | | 3.1 |

Note:
*[1]Tetraethylenetetramine (hereinafter the same)
*[2]N-Aminoethylenepiperazine (hereinafter the same)
*[3]The viscosity increased.

EXAMPLE 5

Pulp (LBKP) beaten to a Canadian standard freeness (CSF) of 400 ml was adjusted to a slurry concentration of 1.0% by weight and stirred for 1 minute. To the pulp slurry were added 0.3 part by weight of the epoxy resin aqueous dispersion prepared in Example 1 and 0.2 part by weight of position as shown in Table 2. The results of measurement are shown in Table 2.

COMPARATIVE EXAMPLES 14 AND 15

Test pieces were prepared in the same manner as in Example 5, except for using the epoxy resin aqueous dispersion prepared in Example 1 and the water-soluble polyamine type curing agent shown in Table 2. The results of measurement are shown in Table 2.

COMPARATIVE EXAMPLE 16

Test pieces were prepared in the same manner as in Example 5, except for using the epoxy resin aqueous dispersion prepared in Comparative Example 8 and the water-insoluble polyamine type curing agent shown in Table 2. The results of measurement are shown in Table 2.

to obtain an epoxy resin aqueous dispersion having an average particle size of 2.5 μm.

EXAMPLES 10 AND 11

Test pieces were prepared in the same manner as in Example 9, except for using the epoxy resin aqueous dispersion prepared in Example 9 and the water-insoluble polyamine type curing agent shown in Table 3. The results of measurement are shown in Table 3.

TABLE 2

|  | Example No. |  |  |  |  | Comparative Example No. |  |  |  |  |  |  |
| --- | --- | --- | --- | --- | --- | --- | --- | --- | --- | --- | --- | --- |
|  | 5 | 6 | 7 | 8 | 9 | 10 | 11 | 12 | 13 | 14 | 15 | 16 |
| Pulp composition (part): |  |  |  |  |  |  |  |  |  |  |  |  |
| Pulp (LBKP) | 100 | 100 | 100 | 100 | 100 | 100 | 100 | 100 | 100 | 100 | 100 | 100 |
| Epoxy resin aqueous dispersion | 0.3 | 0.1 | 0.1 | 2.0 | — | 0.05 | 3.0 | 0.04 | 0.21 | 0.3 | 0.1 | 0.3 |
| Water-insoluble polyamine curing agent: |  |  |  |  |  |  |  |  |  |  |  |  |
| Ancamide 500 | — | 0.3 | — | — | — | — | — | — | — | — | — | 0.2 |
| Ancamide 502 | 0.2 | — | — | — | — | 0.03 | — | 0.26 | 0.09 | — | — | — |
| Ancamide 503 | — | — | 0.4 | — | — | — | 2.5 | — | — | — | — | — |
| Ancamine 1618 | — | — | — | 2.0 | — | — | — | — | — | — | — | — |
| Water-soluble polyamine curing agent: |  |  |  |  |  |  |  |  |  |  |  |  |
| TETA | — | — | — | — | — | — | — | — | — | 0.2 | — | — |
| N-AEP | — | — | — | — | — | — | — | — | — | — | 0.3 | — |
| Practical Properties: |  |  |  |  |  |  |  |  |  |  |  |  |
| Folding endurance (times) | 24 | 26 | 23 | 20 | 12 | 18 | 10 | 13 | 15 | 11 | 14 | 15 |
| Relative burst strength* | 142 | 132 | 138 | 143 | 100 | 104 | 139 | 127 | 132 | 113 | 117 | 121 |
| Relative ring crush strength* | 122 | 114 | 118 | 121 | 100 | 102 | 118 | 112 | 117 | 108 | 118 | 114 |
| Surface strength | 16 | 14 | 15 | 14 | 7 | 8 | 14 | 12 | 11 | 9 | 10 | 9 |

Note: *The result of Comparative Example 9 was taken as 100.

EXAMPLE 9

Fifteen parts by weight of an epoxy resin aqueous dispersion shown below, 7 parts by weight of a polyaminoamide type curing agent comprising an aliphatic polyalkylene polyamine condensate "Ancamide 502" (sold by ACI JAPAN) as a water-insoluble polyamine type curing agent, 100 parts by weight of common portland cement, 100 parts by weight of siliceous sand NO. 6, and a prescribed amount of water for preparation were thoroughly kneaded to obtain a uniform mortar composition. Test pieces were prepared from the resulting mortar composition for measurement of various physical properties, and measurements were conducted. The results obtained are shown in Table 3.

| Preparation of Epoxy Resin Aqueous Dispersion: | Part by Wt. |
| --- | --- |
| Bisphenol A type epoxy resin "AER331C", produced by Asahi Kasei Kogyo K.K., (epoxy equivalent: 190) | 100 |
| Microcrystalline cellulose "AVICEL RC 591", produced by Asahi Kasei Kogyo K.K. | 0.5 |
| Nonionic surface active agent (polyoxyethylene nonyl-phenyl ether type) "Newcol 506", produced by Nippon Nyukazai K.K. | 1.0 |
| Purified water | 100 |

The nonionic surface active agent was previously formulated into a 25% by wight aqueous solution. The microcrystalline cellulose was previously formulated into a 5% by weight aqueous dispersion. All the components were uniformly dispersed in a homomixer at 6000 rpm for 15 minutes

EXAMPLE 12

Test pieces were prepared in the same manner as in Example 9, except for using the epoxy resin aqueous dispersion prepared in Example 9, an acrylic latex "A1500", produced by Asahi Kasei Kogyo K.K. (glass transition temperature: −7° C.), and "Ancamide 502" (sold by ACI JAPAN) as a water-insoluble polyamine type curing agent. The results of measurement are shown in Table 3.

EXAMPLE 13

Test pieces were prepared in the same manner as in Example 12, except for replacing a part of "Ancamide 502" (sold by ACI JAPAN) used in Example 12 with a curing agent comprising a modified polyamide compound "Casamid 2221" as a water-insoluble polyamine type curing agent (sold by ACI JAPAN). The results of measurement are shown in Table 3.

EXAMPLE 14

Test pieces were prepared in the same manner as in Example 9, except for further using "Metolose 90SH400", produced by Shin-Etsu Chemical Co., Ltd., as a water-retaining agent. The results of measurement are shown in Table 3.

COMPARATIVE EXAMPLES 17 TO 20

Test pieces were prepared in the same manner as in Example 9, except for using the epoxy resin aqueous dispersion prepared in Example 9 and various water-insoluble polyamine type curing agents as shown in Table 3. The results of measurement are shown in Table 3.

COMPARATIVE EXAMPLES 21 AND 22

Test pieces were prepared in the same manner as in Example 9, except for using the epoxy resin aqueous dispersion prepared in Example 9 and various water-soluble polyamine type curing agents as shown in Table 3. The results of measurement are shown in Table 3.

COMPARATIVE EXAMPLE 23

The same components of the epoxy resin aqueous dispersion as used in Example 9 were dispersed in a homomixer at a reduced number of rotation (1000 rpm) to obtain an epoxy resin aqueous dispersion having an average particle size of 12 μm. Test pieces were prepared in the same manner as in Example 9, except for using 15 parts by weight of the above-obtained epoxy resin aqueous dispersion and 7 parts by weight of a water-insoluble polyamine type curing agent "Ancamide 502" (sold by ACI JAPAN). The results of measurement of various physical properties are shown in Table 3.

COMPARATIVE EXAMPLE 24

An epoxy resin aqueous dispersion was prepared in the same manner as in Example 9, except for excluding the microcrystalline cellulose "AVICEL RC 591", produced by Asahi Kasei Kogyo, K.K. from the formulation. Test pieces were prepared in the same manner as in Example 9 using the thus prepared epoxy resin dispersion, and various physical properties were measured. The results obtained are shown in Table 3.

UTILITIES IN INDUSTRIES

The aqueous dispersion composition according to the present invention exhibits excellent water resistance, heat resistance, and adhesion and is widely applicable, e.g., to paints, adhesives, self-adhesives, converted paper, textile auxiliaries, constructional materials, water resistance enhancing agents for coated paper, and the like. Paints include concrete paints, wood paints, metal paints, domestic paints, leather paints, and floor polishes. Adhesives include wood adhesives, adhesives for laminating a wrapping material, canning adhesives, tiling adhesives, and flooring adhesives. Self-adhesives include wrapping adhesive tape, adhesive labels, labels for frozen foods, removable labels, POS labels, adhesive wall paper, and adhesive floorings. Converted paper includes art paper, coated paper, lightweight coated paper, cast coated paper, coated board, carbonless copying paper, and impregnated paper. Textile auxiliaries include those for nonwoven fabric, carpet, electric blankets, laminated cloth, printed cloth, and tire coating. Constructional materials include sealants, cement additives, and waterproof materials.

We claim:

1. An aqueous dispersion composition comprising an epoxy resin aqueous dispersion consisting of 100 parts by weight of an epoxy resin, 0.1 to 5.0 parts by weight of microcrystalline cellulose, and 0.1 to 10 parts by weight of a surface active agent; and a water-insoluble polyamine curing agent, wherein said epoxy resin aqueous dispersion has an average particle size, as measured by a laser particle size distribution meter, of less than 10 μm, and said water-insoluble polyamine curing agent is a curing agent comprising at least one member selected the group consisting of a reaction product between a polyalkylene polyamine and a

TABLE 3

| | Example No. | | | | | | Comparative Example No. | | | | | | | |
|---|---|---|---|---|---|---|---|---|---|---|---|---|---|---|
| | 9 | 10 | 11 | 12 | 13 | 14 | 17 | 18 | 19 | 20 | 21 | 22 | 23 | 24 |
| Mortar Composition (part by wt.) | | | | | | | | | | | | | | |
| Epoxy resin aqueous dispersion | 15 | 15 | 4 | 10 | 10 | 10 | 2 | 20 | 7 | 16 | 15 | 15 | 15 | 15* |
| Acrylic latex (A15000) | — | — | — | 5 | 5 | — | — | — | — | — | — | — | — | — |
| Water-insoluble polyamine curing agent: | | | | | | | | | | | | | | |
| Ancamide 500 | — | 12 | — | — | — | — | — | 17 | 16 | — | — | — | — | — |
| Ancamide 502 | 7 | — | 2 | 5 | 3.75 | 7 | 0.8 | — | — | 6 | — | — | 7 | 7 |
| Casamid 2221 | — | — | — | — | 1.25 | — | — | — | — | — | — | — | — | — |
| Water-soluble polyamine curing agent: | | | | | | | | | | | | | | |
| TETA | — | — | — | — | — | — | — | — | — | — | 7 | — | — | — |
| N-AEP | — | — | — | — | — | — | — | — | — | — | — | 7 | — | — |
| Water-retaining agent (90SH400) | — | — | — | — | — | 0.5 | — | — | — | — | — | — | — | — |
| Common portland cement | 100 | 100 | 100 | 100 | 100 | 100 | 100 | 100 | 100 | 100 | 100 | 100 | 100 | 100 |
| Siliceous sand No. 6 | 100 | 100 | 100 | 100 | 100 | 100 | 100 | 100 | 100 | 100 | 100 | 100 | 100 | 100 |
| Water | 55 | 60 | 50 | 57 | 57 | 57 | 55 | 60 | 50 | 57 | 55 | 55 | 55 | 55 |
| Practical Properties: | | | | | | | | | | | | | | |
| Workability | good | good | good | good | good | good | good | bad | medium | good | bad | bad | good | medium |
| Tensile bond strength (kg/cm$^2$): | | | | | | | | | | | | | | |
| 20° C., 65% RH × 7 dys | 21.8 | 22.0 | 18.4 | 26.1 | 26.0 | 23.5 | 11.2 | 30.2 | 14.2 | 18.9 | 20.2 | 21.3 | 18.2 | 17.2 |
| 5° C., 65% RH × 7 dys | 8.2 | 10.1 | 7.8 | 18.1 | 18.1 | 8.5 | 4.2 | 11.2 | 8.7 | 7.4 | 12.2 | 14.6 | 7.5 | 7.0 |
| Water-resistant strength** (kg/m$^2$) | 21.5 | 21.8 | 17.2 | 25.3 | 25.2 | 23.1 | 5.8 | 28.9 | 11.8 | 16.2 | 10.2 | 11.5 | 16.2 | 15.2 |
| Compressive strength** (kg/m$^2$) | 400 | 410 | 415 | 380 | 395 | 405 | 370 | 360 | 380 | 370 | 410 | 400 | 380 | 370 |

Note:
*An epoxy resin aqueous dispersion having the same composition as that prepared in Example 9, except for excluding "AVICEL RC 591", produced by Asahi Kasei Kogyo, K.K.
**The test piece had been cured at 20° C., 65% RH for 7 days.

polymerized fatty acid, an alicyclic polyamine compound modified with an epoxy resin, and an aliphatic polyamine compound modified with an epoxy resin.

2. The aqueous dispersion composition as in claim 1, wherein said epoxy resin has an epoxy equivalent of from 100 to 1,500.

3. The aqueous dispersion composition as in claim 1, wherein said epoxy resin is a polymer obtained by polymerizing at least one monomer selected from the group consisting of glycidyl ethers, glycidyl esters, glycidylamines, linear aliphatic epoxides, and alicyclic epoxides.

4. The aqueous dispersion composition as in claim 1, wherein said surface active agent is selected from the group consisting of anionic surface active agents, cationic surface active agents, amphoteric surface active agents, and non-ionic surface active agents.

5. A coating composition comprising a pigment for paper and a binder for the pigment, which contains 0.1 to 5 parts by weight of the aqueous dispersion composition as defined in claim 1 and 6 to 20 parts by weight of the binder for the pigment each per 100 parts by weight of the pigment for paper.

6. The coating composition as in claim 5, wherein said aqueous dispersion composition has a weight ratio of the epoxy resin to the water-insoluble polyamine curing agent of from 0.1 to 2.0.

7. A pulp which contains 0.1 to 5 parts by weight of the aqueous dispersion composition as defined in claim 1 per 100 parts by weight of the pulp.

8. The pulp composition as in claim 7, wherein said aqueous dispersion composition has a weight ratio of the epoxy resin to the water-insoluble polyamine curing agent of from 0.1 to 2.0.

9. A mortar composition comprising cement and aggregate, which contains 3 to 35 parts by weight of the aqueous dispersion composition as defined in claim 1 and 50 to 500 parts by weight of an aggregate per 100 parts by weight of the cement.

10. The mortar composition as in claim 9, wherein said aqueous dispersion composition has a weight ratio of the epoxy resin to the water-insoluble polyamine curing agent of from 0.5 to 2.5.

11. The mortar composition as in claim 9, which further comprises 10 to 120 parts by weight of at least one latex selected from the group consisting of a styrene-butadiene copolymer latex and an acrylic copolymer latex.

* * * * *